May 6, 1924.
J. S. VICKERS
RAT TRAP
Filed Feb. 28, 1921
1,493,299
2 Sheets-Sheet 1
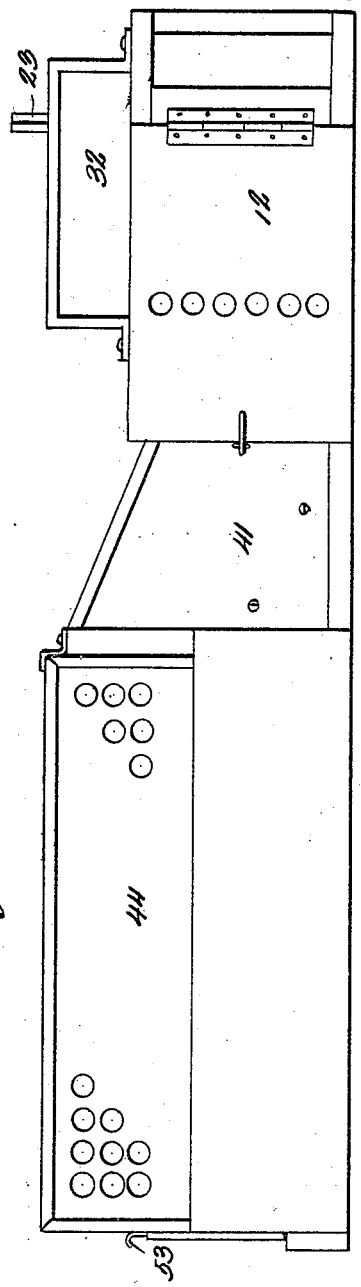
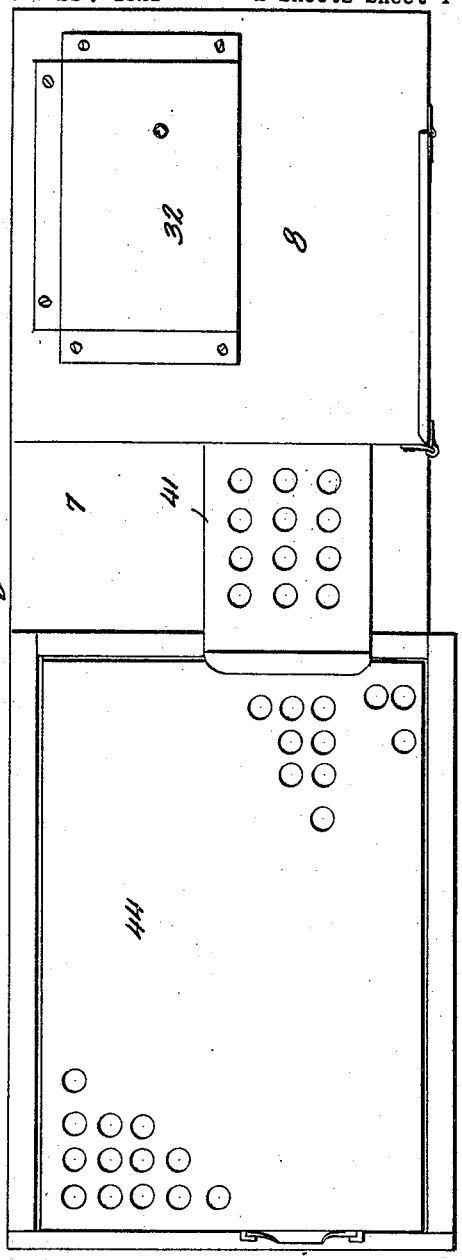
WITNESSES
Inventor
James S. Vickers.
By Richard B. Owen
Attorney

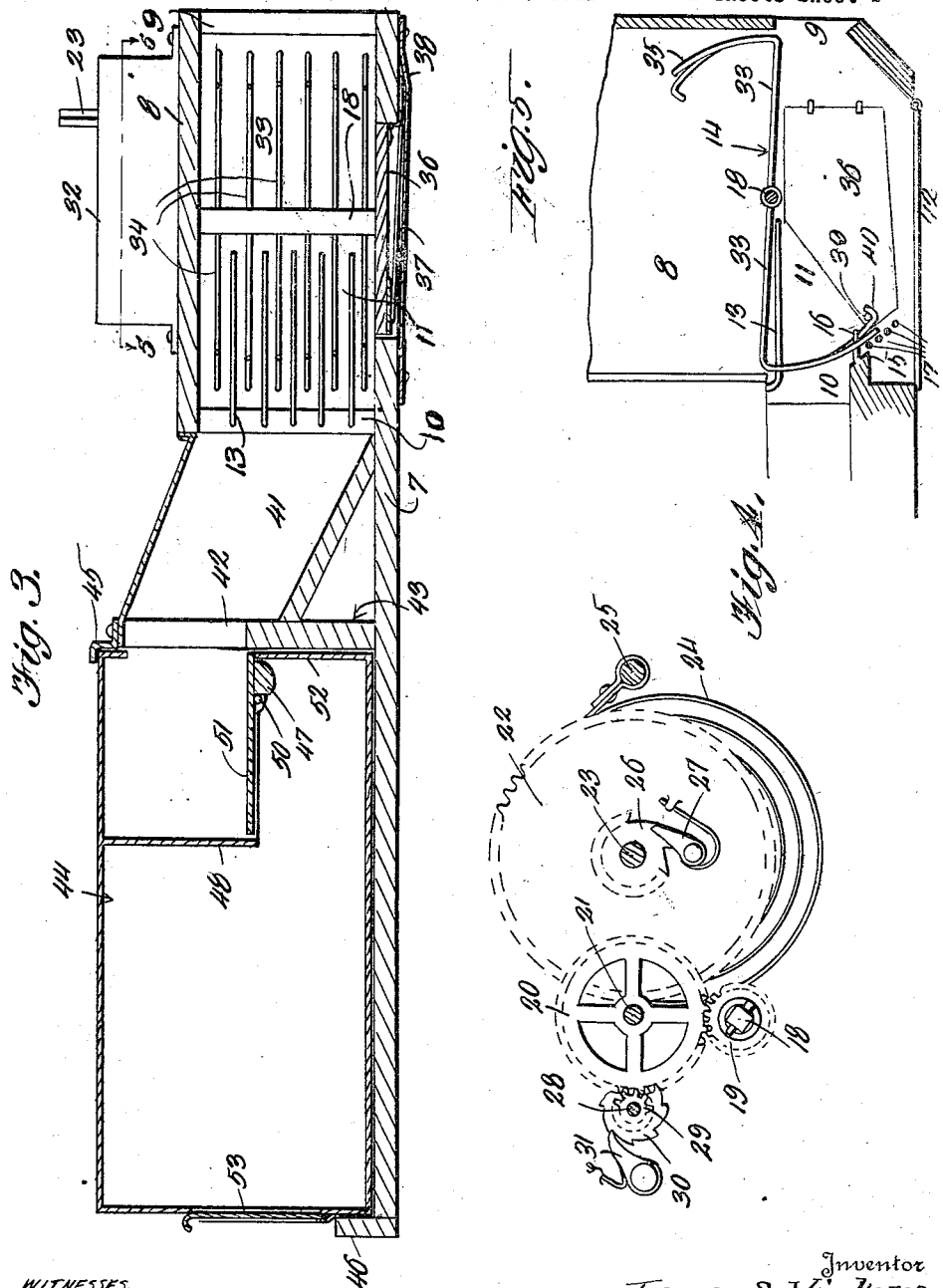

Patented May 6, 1924.

1,493,299

UNITED STATES PATENT OFFICE.

JAMES S. VICKERS, OF ALEXANDER CITY, ALABAMA.

RAT TRAP.

Application filed February 28, 1921. Serial No. 448,489.

*To all whom it may concern:*

Be it known that I, JAMES S. VICKERS, a citizen of the United States, residing at Alexander City, in the county of Tallapoosa and State of Alabama, have invented certain new and useful Improvements in Rat Traps, of which the following is a specification.

This invention relates to new and useful improvements in animal traps and more particularly to that type which may be termed an ever-set trap, the primary object of the invention being to provide an automatic turnstile for sweeping the animals into the trap and for retaining them therein, the invention also having for its primary object to provide means which are entirely independent of the turnstile and disposed in the path of movement thereof, for releasably retaining the turnstile in set position.

Another object of the invention is to provide a particularly constructed turnstile in combination with a passage whereby it is absolutely impossible for a trapped animal to escape past the turnstile after being caught.

A further object of the invention is to provide a device of the above nature including a removable terminal casing, which is quickly detachable from the remainder of the trap so that the trapped animals may be carried, without fear of escape, to any desired place.

Other objects and advantages of the invention will become apparent during the course of the following description.

In the accompanying drawings forming a part of the application and wherein like numerals are employed to designate like parts throughout the several views.

Figure 1 is a side elevation of the invention.

Figure 2 is a top plan of the same.

Figure 3 is a vertical longitudinal section of the same.

Figure 4 is an enlarged detail of the spring motor used in conjunction with the trap.

Figure 5 is a horizontal section of a portion of the trap.

Referring now to the drawings wherein for the purpose of illustration is shown the preferred embodiment of the invention, the numeral 7 designates the base of the trap and comprises an elongated rectangular board. The box shaped casing 8 is secured upon one end of the base and the opposite ends thereof are provided with doorways 9 and 10. These doorways are provided at opposite ends of a passageway 11 through the casing 8, as best seen in Figure 5. It will be noted that this passage is contiguous to one side of the casing 8, this side being provided with a hinged door 12. When this door is closed, it forms one side wall of the passageway 11, and half of the opposite side of the passage is provided by a plurality of horizontal bars 13, and the other half by a turnstile indicated in its entirety by the numeral 14. The horizontal bars 13 which extend the full height of the passage are spaced vertically, corresponding ends being secured in any suitable manner to one edge of the doorway 10. The opposite corresponding ends of the bars 13 are free and are arranged adjacent the pivot shaft 18 of the turnstile.

The opposite vertical edge of the opening or doorway 10 is inclined as is clearly shown in Figure 5 by the numeral 15, and to this inclined edge are secured a plurality of projecting pins 16 extending toward the door 9 or entrance to the trap. To one side of the inclined edge 15 of the doorway are arranged a plurality of vertical spaced bars 17 extending in the same direction as the inclined wall or edge 15. These bars 17 are secured to the top and bottom of the casing 8 for a purpose which will be presently described. The end of the side of the casing having the door 12 hinged thereto adjacent the entrance 9, is arranged diagonally of the casing 8 for the same purpose for which the bars 17 are provided.

The trapping mechanism consists of a turnstile 14 consisting of a vertical shaft 18 journaled in the top and bottom of the casing 8. The upper end of this shaft projects above the top of the casing and the terminal of the shaft is square as best seen in Figure 4, and provided with a cog wheel 19 adapted for meshing engagement with a relatively large cog 20 keyed to a vertical shaft 21. A smaller cog not shown, is secured to the shaft 21 beneath the cog 20 for meshing engagement with a large cog wheel 22 mounted upon a winding shaft 23. A clock spring 24 has one end thereof secured to the winding shaft 23, and the opposite end of the spring is secured to a suitable post 25, in the well known manner. A ratchet wheel 26 is also secured to the winding shaft 23, or may in fact form a part of the larger winding cog 22. A pivoted spring pressed pawl 27 is pivotally mounted upon the winding cog for cooperation with the ratchet 26 to prevent accidental unwinding of the spring.

In order to prevent rebounding of the turnstile after it moves to a set position, as will be clearly explained hereinafter, a vertical shaft 28 is journaled in a frame which supports the spring motor mechanism, and is arranged adjacent the shaft 21. A small cog 29 is secured to this shaft 28 for meshing engagement with the cog 20 whereby rotation of the shaft 21 will be transmitted to the shaft 28. A ratchet wheel 30 is also secured to the shaft 28 and cooperates with a spring pressed pawl 31 in the well known manner. It will of course be obvious that this ratchet wheel 30 may be associated with the shaft 18 of the turnstile and the shaft 28 may be dispensed with. This spring motor mechanism is housed by a suitable casing 32 which may be hinged to the top of the casing 8.

The two arms 33 of the turnstile are secured to the shaft 18 and extend in opposite directions, each comprising a plurality of horizontally extending vertically spaced rods or bars 34. The free ends of the turnstile arms, or more strictly speaking, the free ends of the bars 34 constituting the arms are angularly disposed and slightly arcuated to form curved extremities 35. These extremities of the bars 34 are arranged in the same relation to their respective bars, and either one extremity 35 or the other is adapted to normally extend across the passageway 11 and close the doorway 10 of the passage. The extremities 35 of the bars 34 are adapted to pass between the pins 16 and the vertically spaced bars 13 forming one half of one side of the passageway 11, and when the trap is set, the extremities of one arm are arranged between the pins 16 and the bars 13 to absolutely prevent the escape of the animal which has been swept through the doorway 10 by the turnstile in a manner which will be presently described. When the turnstile is arranged in a set or its normal position, one arm 33 thereof is arranged in back of the horizontal bars 13, while the other arm 33 thereof, forms the other half of the side wall of the passage way 11 which is not covered by the bars 13.

The means for releasably maintaining the turnstile in a set position and against the influence of the clock spring, 24 consists of a vertically movable platform 36 hinged at one end to the edge of an opening in the floor of the passageway 11. The pivot of the platform is arranged adjacent the entrance 9 so that the animal will be well within the passageway 11 when the trap is sprung. A spring 37 as best seen in Figure 3, is secured to the base 7 and adapted to exert an upward pressure against the bottom of the movable platform 36 to normally hold the same on a level with the upper surface of the base 7. A cover plate 38 is secured to the bottom of the base to enclose and protect the spring 37.

An upstanding pin 39 projects from the free end of the platform 36 to co-operate with the angular ends of the turnstile to releasably maintain the turnstile in a set position. The lower bar of each extremity 35 has its free end hooked as at 40 to engage with the pin 39 for stopping the movement of the turnstile at the proper point so that one or the other of the curved extremities 35 are disposed across the doorway 10. It is to be particularly noted that the entire platform 36 is disposed in the path of movement or sweep of the turnstile arms 33 so that there is absolutely no possibility of the arms missing the animal standing upon the platform.

An animal may be attracted into the passage way 11 by placing small particle of food upon the bars of the angular extremities 35 so that the food or lure can be seen or scented prior to his entrance to the doorway 9. However, after the animal has entered into the passageway 11 and disposes his weight upon the platform 36, it will move downwardly under the tension of the spring 37 and disengage the pin 39 from the angular extremity of the turnstile which is engaged therewith. This will of course place the turnstile under the control of the coiled spring, and immediately the turnstile will turn in a clockwise direction and sweep the animal from the platform through the doorway 10. When the hooked end 40 of one arm of the turnstile engages the pin 39 upon completing its movement there will be a tendency for the turnstile to rebound due to the impact against the pin 39. However, this will be prevented by the pawl 31 engaging with a tooth of the ratchet wheel 30. Consequently, the animals will find it impossible to escape past the angular end of the turnstile arm which is disposed across the doorway 10. The bars 17 and peculiar construction of a corner of the casing 8 are provided in order that the turnstile may sweep close to these parts.

In order to make doubly certain that the animal will be trapped an inclined conduit or passageway 41 leads from the door-way 10, through an opening 42 in a wall of a box-like frame 43 secured upon the base 7 at the end opposite the casing 8. A removable closed receptacle 44 is adapted to be retained within the boxlike structure 43 to receive and retain the trapped animals. It will be noted that the upper edge of the wall in which the opening 42 is provided is also provided with a cleat or a clip 45 adapted to overlap one end of the receptacle 44 for preventing accidental displacement thereof. The end of the boxlike structure opposite the wall having the opening 42 therein is relatively narrow as clearly seen in the drawings so that the receptacle 44 may be readily removed from the structure when desired.

The end 47 of the receptacle 44 which is adapted to abut the wall having the opening 42 therein, is also provided with an opening to align with the opening 42, and a boxlike casing 48 is secured or formed within the receptacle 44 for reception of the animal. The bottom of this casing 48 is open and the lower edges of opposite sides thereof are angularly disposed and as at 49 to provide bearings for a pivot rod 50 extending transversely of the casing, and to provide an abutment to limit the upward swinging movement of a platform 51 mounted upon the rod 50. Weights 52 are secured to the under side of the swinging platform 51 to one side of the pivot rod 50 whereby it is normally disposed in a horizontal plane. The opposite end of the receptacle 44 is provided with a sliding door 53 whereby the trapped animals may be removed. As clearly shown in Figures 1 and 2, the top and sides of the receptacle 44 are suitably apertured to provide for ventilation of the receptacle, and to facilitate drowning of the animals trapped when such disposal is desired.

From the foregoing, it will be seen that after the animal has been swept into the conduit 41 he will naturally endeavor to escape therefrom, either past the angular ends of the turnstile or will travel through the opening 42 in the boxlike structure 43. Upon entering the casing 48 within the receptacle 44, the weight of the animal upon the swinging platform 51 will counterbalance the weights 52 and the animal will be plunged into the receptacle for retention.

The foregoing description and accompanying drawings have reference to what might be considered to be the approved or preferred form of my invention. I desire it to be understood that I may make such changes in the construction, combination and arrangement of parts, materials, dimension, et cetera, as may prove expedient and fall within the scope of the appended claims.

Having fully described my invention what I claim new and desire to secure by Letters Patent is:—

1. In a trap, a passageway, an offset casing, a turnstile having arms adapted for movement through said passageway, and casing, said arms having angular extremities either one of which is adapted to extend across the passageway to normally close the same, bars separating the passageway from the casing, and the arms of the turnstile being adapted to pass inwardly of the casing between said bars.

2. In a trap, a passage way, an automatic turn stile mounted adjacent one side of the passage-way, the arms of the turn stile being adapted to normally extend parallel to the passage-way and along one side thereof, each arm consisting of a plurality of parallel vertically spaced rods, the terminals of the rods of each arm being disposed at an angle and normally arranged to extend across the passage-way to close the same, the terminal of one of said rods being bent to form a hook, and a depressible platform arranged in the passage-way and having an upstanding element to co-operate with the hooked end of said rod for normally retaining the angularly disposed terminals of one of the arms across the passage-way.

3. A trap comprising a casing having a passage therein, a housing for trapping animals communicating with one end of the passage to form an entrance for the housing, an automatic turnstile mounted on a vertical axis beside the passage and including a horizontal arm adapted to extend longitudinally of the passage beside the same, and said arm having an angularly extending free end adapted to normally extend transversely of the passage at one end thereof to close the entrance to the housing.

In testimony whereof I affix my signature in presence of two witnesses.

JAMES S. VICKERS.

Witnesses:
  O. Cie Warren,
  H. H. Gunne.